United States Patent [19]

Bertolacini et al.

[11] 4,134,823

[45] Jan. 16, 1979

[54] CATALYST AND HYDROCARBON CONVERSION PROCESS

[75] Inventors: Ralph J. Bertolacini, Chesterton, Ind.; Dae K. Kim, Naperville, Ill.

[73] Assignee: Standard Oil Company (Indiana), Chicago, Ill.

[21] Appl. No.: 817,144

[22] Filed: Jul. 20, 1977

Related U.S. Application Data

[63] Continuation-in-part of Ser. No. 640,005, Dec. 12, 1975, abandoned.

[51] Int. Cl.$^2$ .............................................. C10G 43/08
[52] U.S. Cl. ...................................... 208/65; 208/64; 208/135; 252/463
[58] Field of Search ................... 208/64, 65, 134, 135, 208/138; 252/463

[56] References Cited

U.S. PATENT DOCUMENTS 3,772,184  11/1973  Bertolacini et al. ................... 208/65

Primary Examiner—O. R. Vertiz
Assistant Examiner—Wayne A. Langel
Attorney, Agent, or Firm—Thomas J. Connelly; Arthur G. Gilkes; William T. McClain

[57] ABSTRACT

Disclosed is a catalyst essentially free of platinum, comprising from about 0.1 to about 2 weight percent rhenium and about 0.1 to about 2 weight percent gallium supported on a solid inorganic refractory oxide. A hydrocarbon conversion process, such as catalytic reforming, is also disclosed wherein the process contacts the above described catalyst with a hydrocarbon stream boiling in the range of about 70° F. to about 500° F. and hydrogen. A two-step process is also disclosed wherein a platinum catalyst is first contacted with a hydrocarbon stream to achieve a partial conversion followed by contacting the above described catalyst to achieve further conversion.

25 Claims, 1 Drawing Figure

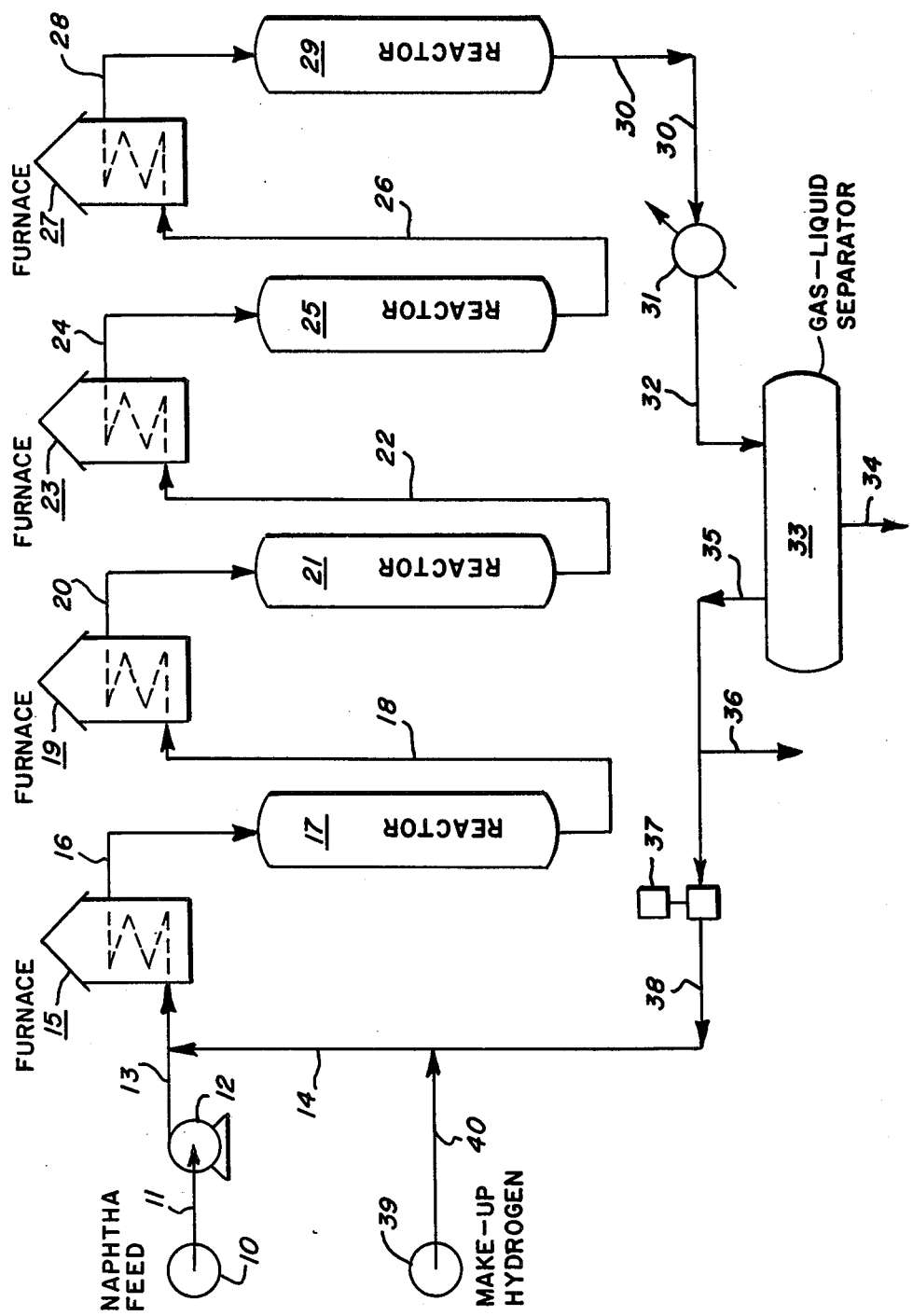

CATALYST AND HYDROCARBON CONVERSION PROCESS

CROSS-REFERENCE TO RELATED APPLICATIONS

This application is a continuation-in-part of patent application Ser. No. 640,005, filed Dec. 12, 1975, now abandoned.

BACKGROUND OF THE INVENTION

The reforming of petroleum hydrocarbon streams is one of the important petroleum refining process that may be employed to provide high-octane number hydrocarbon blending components for gasoline. In the typical reforming process, the reactions comprise dehydrogenation reactions, isomerization reactions, and hydrocracking reactions. The dehydrogenation reactions include the dehydrogenation of cyclohexanes to aromatics, the dehydroisomerization of alkylcyclopentanes to aromatics, the dehydrogenation of paraffins to olefins, and the dehydrocyclization of paraffins and olefins to aromatics. The isomerization reactions include isomerization of n-paraffins to isoparaffins, the hydroisomerization of olefins to isoparaffins, the isomerization of alkylcyclopentanes to cyclohexanes, and the isomerization of substituted aromatics. The hydrocracking reactions include hydrocracking of paraffins and hydrodesulfurization. Adequate discussion of the reactions occurring in a reforming reaction zone and a discussion of reforming are present in CATALYSIS, Vol. VI, P. H. Emmett, editor, Reinhold Publishing Corporation, 1958, pages 497–498; PETROLEUM PROCESSING, R. J. Hengstebeck, McGraw-Hill Book Company, Inc., 1959, pages 179–184; and MODERN PETROLEUM TECHNOLOGY, G. D. Hobson and W. Pohl, John Wiley and Sons, 1973, pages 327–343.

It is well known by those skilled in the art that several catalysts are capable of reforming petroleum naphthas and hydrocarbons that boil in the gasoline boiling range. Although reforming may be carried out through the use of molybdena-on-alumina catalysts, chromium-oxides-on-alumina catalysts, platinum-halogen-on-alumina catalysts, and platinum-aluminosilicate-material-alumina catalysts, the catalysts employing platinum as a hydrogenation component are generally employed today in the reforming processes of the petroleum industry.

It has been found that improved reforming may be effected by the use of a new catalytic composition. This catalyst is particularly suited for use either as the catalyst in a reforming system that is employed to convert mildly-reformed or partially-reformed naphthas and hydrocarbon streams or as the second or last catalyst in a multiple-catalyst reforming system.

Embodiments of the reforming process employing this catalyst, the process of the present invention, provide high-octane-number blending material for unleaded and/or low-lead motor fuels and also production of lower boiling materials such as propane.

SUMMARY OF THE INVENTION

This invention relates to a platinum free catalyst for the conversion of hydrocarbon and processes using such catalyst. The catalytic composition, which can be used for the reforming of petroleum hydrocarbons, comprises from about 0.1 to about 2 weight percent rhenium and from about 0.1 to about 2 weight percent gallium supported on a solid support comprising a porous refractory inorganic oxide. Preferably the catalytic composition comprises from about 0.2 to about 0.8 weight percent rhenium and from about 0.2 to about 0.8 weight percent gallium.

The porous refractory inorganic oxide comprises catalytically active alumina, silica-alumina, silica-magnesia, titania-alumina or zinc-oxide-alumina and preferably is a halogen-free inorganic oxide. One especially preferred active alumina comprises gamma alumina and a preferred catalyst comprises about 0.5 weight percent rhenium and about 0.5 weight percent gallium supported on gamma alumina.

The solid support ca also contain mordenite such as a co-catalytic support comprising mordenite and a porous refractory inorganic oxide, said mordenite having a silica-to-alumina ratio within the range of about 6 to about 100. In mordenite containing supports, such as mordenite and alumina, mordenite is suspended in and distributed throughout a matrix of said alumina, said mordenite being present in an amount of about 1 weight percent to about 50 weight percent, based on the weight of said support. These mordenite containing supports can be prepared by blending finely-divided mordenite-type alumino-silicate material into a sol or gel of said refractory inorganic oxide to form blend, a gelling said blend, if a sol is present, to form a gel by adding a solution of a suitable inorganic ammonium-affording compound, and drying and calcining the gel to form a calcined material.

The preparation of these catalytic compositions comprises impregnating the solid support with soluble compounds of rhenium and gallium followed by drying and calcining.

The described catalysts can be used in a process for the catalytic conversion of a hydrocarbon feed, said feed comprising a hydrocarbon stream boiling in the range of about 70° F. to about 500° F., which process comprises contacting said platinum free catalyst with said hydrocarbon feed and hydrogen, at a pressure of about 50 psig to about 1,000 psig, a weight hourly space velocity of about 0.5 to about 10 weight units of hydrocarbon per hour per weight unit of catalyst, a hydrogen addition rate of about 1,500 to about 15,000 standard cubic feet per barrel of feed and at an average catalyst temperature of about 850° F. to about 1,050° F. Preferably the pressure is about 50 psig to about 450 psig, the weight hourly space velocity is about 0.9 to about 4 weight units of hydrocarbon per hour per weight unit of catalyst, the hydrogen addition rate is about 4,000 to about 10,000 standard cubic feet per barrel of feed and the average catalyst temperature is about 875° F. to about 1,000° F.

The described catalyst can also be used in a two-step process which comprises: first contacting a catalyst comprising platinum on a solid inorganic oxide support with the hydrocarbon feed and hydrogen to achieve partial catalytic conversion, followed by a second step of contacting the platinum free catalyst, comprising from about 0.1 to about 2 weight percent rhenium and from about 0.1 to about 2 weight percent gallium supported on a solid support comprising a porous refractory inorganic oxide, with the partially converted hydrocarbon feed and hydrogen, the contacting of both catalysts being conducted at a pressure of about 50 psig to about 1,000 psig, a weight hourly space velocity of about 0.5 to about 10 weight units of hydrocarbon per hour per weight unit of catalyst, a hydrogen addition rate of about 1,500 to about 15,000 standard cubic feet per barrel of feed and at an average catalyst temperature of about 850° F. to about 1,050° F. Preferably the pressure is about 50 psig to about 450 psig, the weight hourly space velocity is about 0.9 to about 4 weight units of hydrocarbon per hour per weight unit of catalyst, the hydrogen addition rate is about 4,000 to about 10,000 standard cubic feet per barrel of feed and the average catalyst temperature is about 875° F. to about 1,000° F.

The preparation of the catalyst may comprise blending finely-divided mordenite into a sol or gel of the refractory inorganic oxide to form a blend, gelling the blend, if a sol is present, to form a gel by adding a solution of a suitable inorganic ammonium-affording compound, and drying and calcining the gel to form a calcined material.

In one embodiment of the process of the present invention, there is provided a process for reforming a hydrocarbon stream in a reforming zone under reforming conditions and in the presence of hydrogen with the rhenium-gallium catalyst.

In another embodiment of the process of the present invention, there is provided a process for reforming a petroleum hydrocarbon stream, which process comprises contacting said hydrocarbon stream in a first reforming zone under reforming conditions and in the presence of hydrogen with a catalyst comprising a platinum group metal and a halide on a catalytically active alumina to produce a first reformate and subsequently contacting said first reformate in a second reforming zone under reforming conditions and in the presence of hydrogen with the rhenium-gallium catalyst.

Accordingly, the process may employ the rhenium-gallium catalyst of the present invention either as the sole catalyst in the reforming process, or, preferably, as the final catalyst in a multiple-catalyst reforming system. Preferably, the process employs the platinum free catalyst of this invention in the last reactor, or tail reactor, of a multiple-reactor reforming system. The selection of the particular embodiment of the process of the present invention will be dictated by the feedstock to be reformed. If the hydrocarbon stream has already been partially reformed the embodiment of the process employing the rhenium-gallium catalyst as the sole catalyst is suitable.

BRIEF DESCRIPTION OF THE DRAWING

The attached FIGURE presents a simplified schematic flow diagram of a preferred embodiment of the process of the present invention wherein the rhenium-gallium catalytic composition of the present invention is employed in the last reactor, or tail reactor, or a multiple-reactor reforming system.

DESCRIPTION AND PREFERRED EMBODIMENTS

The highly mechanized society of today requires an increasing demand for very-high-octane-number motor fuels. The process of this invention is especially advantageous for the production of high-octane-number blending components for motor fuels by means of the reforming of petroleum hydrocarbon streams boiling in the gasoline boiling range. It may be employed suitably to produce high-octane-number blending components for unleaded and/or low-lead motor fuels. It also may be employed to produce lower boiling materials such as propane.

The embodiments of the process of the present invention may be used to reform a feedstock which is a member selected from the group consisting of a virgin naphtha, a cracked naphtha, a hydrocarbon fraction boiling in the gasoline boiling range, mixtures thereof, and partially-reformed naphthas and other hydrocarbon streams. A naphtha will exhibit a boiling range of about 70° F. to about 500° F., preferably, about 180° F. to about 400° F. The gasoline boiling range comprises temperatures of about 120° F. to about 420° F., preferably about 140° F. to about 380° F. The partially-reformed hydrocarbon streams will exhibit an unleaded research octane number within the range of about 75 to 95. Since many of the above feedstocks may contain appreciable amounts of nitrogen and sulfur compounds, which are deleterious to the first catalyst of that embodiment of the present invention which employs a multiple-catalyst reforming system, it is preferred that the feedstock in this case be subjected to a suitable hydrodesulfurization and/or hydrodenitrogenation treatment, such as hydrofining, prior to use in the embodiment of the process of the present invention in order to reduce both the nitrogen and sulfur levels to tolerable limits.

The process of this invention is capable of upgrading a 50% naphthenic naphtha having a research octane number as low as 40 into a $C_5^+$ gasoline having a research octane number in excess of 100 at a yield of 65 to 90%. Higher $C_5^+$ octane reformates may be produced at slightly reduced yields as the octane value is increased.

The rhenium-gallium catalytic composition of the present invention may be employed for the conversion of various petroleum hydrocarbon streams. In particular, it is a suitable catalyst for the reforming of petroleum naphthas and petroleum hydrocarbon streams boiling in the gasoline boiling range. This catalytic composition comprises about 0.1 to about 2 weight percent rhenium and about 0.1 to about 2 weight percent gallium, preferably about 0.2 to about 0.8 weight percent rhenium and about 0.2 to about 0.8 weight percent gallium, supported on a solid support porous refractory inorganic oxide. The support may comprise mordenite and a porous refractory inorganic oxide. The catalyst may also contain halogen such as chloride or fluoride, preferably chloride.

Rhenium and gallium may be present as the elements, as compounds such as oxides and sulfides, and as mixtures thereof.

The solid support of the rhenium-gallium catalytic composition of the present invention can be a co-catalytic support of mordenite-type alumino-silicate material and a porous refractory inorganic oxide. Suitably, the mordenite is suspended in and distributed throughout a matrix of the porous refractory inorganic oxide.

Preferably, the mordenite-type aluminosilicate material has been cation-exchanged with a member selected from the group consisting of an alkaline earth metal, a rare earth metal, hydrogen, and a hydrogen precursor to reduce the sodium content to a level that is less than 1 weight percent, calculated as the metal. The mordenite-type aluminosilicate material may be present in the co-catalytic solid support in an amount within the range of about 1 weight percent to about 50 weight percent, based on the weight of said support.

A preferred mordenite-type aluminosilicate material is the synthetic Zeolon manufactured by the Norton Chemical Company. Zeolon-H is the hydrogen form of this synthetic mordenite. Mordenite is characterized by its high silica-to-alumina ratio and its crystal structure. The mordenite may have a silica-to-alumina ratio within the range of about 6 to about 100. The composition of a mordenite is given in Kirk-Othmer ENCYCLOPEDIA OF CHEMICAL TECHNOLOGY, 1st ed., Vol. 12, The Interscience Encyclopedia, Inc., New York, page 297 (1954), as $(Ca, Na_2)Al_2Si_9O_{22}.6H_2O$. The proposed structure is one in which the basic building block is a tetrahedron consisting of 1 silicon or alumina atom surrounded by four oxygen atoms. The crystal structure is made up to 4- or 5-membered rings of these tetrahedra. These 4- and 5-membered rings are believed to give the structure its stability. The chains are linked together to form a network having a system of large parallel channels interconnected by small cross channels. Rings of 12 tetrahedra form the large channels. Other synthetic zeolites also have such 12-membered rings, but they have interconnected cages, whereas the mordenite has parallel channels of uniform diameter. For example, synthetic faujasite, which has the formula $Na_3Al_3Si_4O_{14}$, is characterized by a 3-dimensional array of pores which consist of 12-13 Angstrom cages interconnected through 8-9 Angstrom windows.

The mordenite in the catalytic composition of the present invention may be in the unexchanged cation form containing exchangeable sodium and/or calcium ions, or other alkali metal or alkaline earth metal ions. Preferably, the alkali metal cations, such as sodium ions, may be replaced or cation-exchanged with a member selected from the group consisting of an alkaline earth metal, a rare earth metal, hydrogen, and a hydrogen percursor to provide an alkali metal content in the mordenite that is less than 1 weight percent, calculated as the metal. Ammonium ions comprise a hydrogen precursor and may be employed to cation-exchange the alkali metal of the mordenite. Heat is employed to drive off ammonia leaving the mordenite in the hydrogen form. Mordenite differs from other alumino-silicates in that substantially all the exchangeable metal cations may be replaced with hydrogen ions without causing destruction of the characteristic crystal structure of the mordenite.

The porous refractory inorganic oxide that is employed in the rhenium-gallium catalytic composition of the present invention may be a catalytically active alumina, silica-alumina, silica-magnesia, titania-alumina, zinc-oxide-alumina, and the like. Preferably, the porous refractory inorganic oxide is a halogen-free material, that is, it does not contain any halogens, such as chlorine or fluorine. The preferred refractory inorganic oxide is catalytically active alumina, such as gamma-alumina, eta-alumina, and mixtures thereof. A suitable halogen-free alumina may be obtained by the preparation method disclosed in U.S. Pat. No. Re. 22,196. In such method of preparation, metallic aluminum is first amalgamated with a small quantity of mercury and then converted to an alumina sol by the action of water, slightly acidulated by approximately 1% acetic acid. Such typical alumina should have a pore diameter of about 70 Angstroms to about 200 Angstroms and a surface area of at least 150 square meters per gram. Suitably, the surface area should be within the range of about 200 square meters per gram to about 500 square meters per gram.

The rhenium-gallium co-catalytic compositions of the present invention may be prepared in various ways. For example, finely-divided mordenite-type aluminosilicate material may be stirred into a sol or gel of the refractory inorganic oxide and a soluble compound of rhenium and gallium added to the sol or gel, followed by gelling of the sol by the addition of a solution of a suitable inorganic ammonium-affording compound, such as ammonium hydroxide, if a sol is present. The gel is then dried and calcined. In another method of preparation, the finely-divided mordenite is mixed into a sol or gel of the refractory inorganic oxide, the sol, if present, is gelled by the addition of a solution of a suitable inorganic ammonium-affording compound and the resulting gel is subsequently dried, pelleted, calcined, cooled, and impregnated with a solution or solutions of the rhenium-gallium. As an alternate method of preparation, a hydrogel of the refractory inorganic oxide is blended with finely-divided aluminosilicate material, and a solution of a soluble compound of the rhenium and gallium are added to this blend, and the resulting mixture is thoroughly blended. The blended mixture is then dried, pelleted, and calcined. Suitable drying conditions for use in the above described catalyst manufacturing methods comprise a temperature in the range of about 200° F. to about 400° F. and a drying time of about 5 to 30 hours. Suitable calcination conditions comprise a temperature in the range of about 900° F. to 1,400° F. and a calcination time of about 2 to about 20 hours. Preferred drying and calcination condition are a temperature of about 250° F. for about 16 hours and a temperture of about 1,000° F. for about 6 hours, respectively.

The rhenium-gallium catalyst of the present invention is suitable for the conversion of petroleum hydrocarbon streams. In particular, it is employed for the reforming of petroleum hydrocarbon naphthas and those petroleum hydrocarbon streams boiling in the gasoline boiling range. This rhenium-gallium catalyst is effective for converting the heavy paraffins remaining in a reformate; therefore, a preferred embodiment of the process of the present invention is a process which employs a catalyst comprising a platinum group metal and combined halogen on alumina in a first reforming zone and the catalytic composition of the present invention in a second reforming zone. Still more particularly, the catalyst comprising a platinum group metal and combined halogen on alumina is employed in all of the reactors except the tail reactor and the catalytic composition of the present invention is employed in the tail reactor. For selected conditions and selected feedstocks, it is contemplated that the first reforming zone could constitute two or more reactors and the second reforming zone could constitute at least one reactor. In an alternative embodiment of the process of the present invention, the reforming system could comprise one or more reactors containing the non-noble-metal catalyst of the present invention and making up a sole reaction zone. To this latter embodiment, a partially-reformed naphtha would be the ideal feedstock.

According to the present invention, there is provided a process for reforming a petroleum hydrocarbon stream, which process comprises contacting said hydrocarbon stream in a reforming zone under reforming conditions and in the presence of hydrogen with the rhenium-gallium catalyst as described hereinabove. In one embodiment, the process comprises contacting a partially-reformed hydrocarbon stream in a reforming zone under reforming conditions and in the presence of hydrogen with the rhenium-gallium catalyst. In another embodiment of the process of the present invention, the process comprises contacting a petroleum hydrocarbon stream in a first reforming zone under reforming conditions and in the presence of hydrogen with a catalyst comprising a platinum group metal and combined halogen on alumina to produce a first reformate and subsequently contacting said first reformate in a second reforming zone under reforming conditions and in the presence of hydrogen with the non-noble-metal catalyst. This latter embodiment is a process wherein the first reforming zone comprises two or more reactors and the second reforming zone comprises at least one reactor. The platinum group metals include platinum, iridium, osmium, palladium, rhodium, and ruthenium. Platinum is the preferred platinum group metal. Chlorine and fluorine are the preferred halogens.

Typical operating conditions of this reforming process comprise an average catalyst temperature of about 850° F. to about 1,050° F., a pressure of about 50 psig to about 1,000 psig, a weight hourly space velocity (WHSV) of about 0.5 to about 10 weight units of hydrocarbon per hour per weight unit of catalyst, and a hydrogen addition rate of about 1,500 standard cubic feet per barrel (SCFB) to about 15,000 SCFB. Preferred reforming conditions comprise an average catalyst temperature of about 875° F. to about 1,000° F., a pressure of about 50 psig to about 450 psig, a WHSV of about 0.9 to about 4 weight units of hydrocarbon per hour per weight unit of catalyst, and a hydrogen addition rate of about 4,000 SCFB to about 10,000 SCFB. These operating conditions are appropriate for each reforming zone of the multiple-zone embodiment of the process of the present invention.

The process of the present invention can be carried out in any of the conventional types of equipment known to the art. One may, for example, employ catalysts in the form of pills, pellets, granules, broken fragments, or various special shapes, disposed as one or more fixed beds within one or more reaction zones, and the charging stock may be passed therethrough in the liquid, vapor, or mixed phase, and in either upward or downward flow. Alternatively, the catalyst may be in a suitable form for use in moving beds, in which the charging stock and catalyst are preferably passed in countercurrent flow; or in fluidized-solid processes, in which the charging stock is passed upward through a turbulent bed of finely-divided catalyst; or in the suspensoid process, in which the catalyst is slurried in the charging stock and the resulting mixture is conveyed into the reaction zone. A fixed-bed reforming process is exemplified by Ultraforming (Petroleum Engineer, Vol. XXVI, No. 4, April, 1954, at page C-35). In a six-reactor unit with the five fixed-bed reactors on oil and one fixed-bed reactor under regeneration, it is convenient to employ the non-noble-metal catalyst in the last reactor and a mixture (or layers) of the two catalysts in the swing reactor. The reaction products from any of the foregoing processes are separated from the catalyst and fractionated to recover the various components thereof. The hydrogen and unconverted materials are recycled as desired, the excess hydrogen produced in the reformer conveniently being utilized in the hydrodesulfurization of the feed.

Unwanted products in the reforming of petroleum hydrocarbon streams are light hydrocarbon gases and coke. Such products and other compounds, such as polynuclear aromatics and heavy hydrocarbons, result in coke. As the operation progresses, a substantial amount of coke accumulates on the surface of each of the catalysts resulting in an increasingly rapid rate of catalyst deactivation. Consequently, the coke must be removed periodically from the surface. Such coke removal may be accomplished through a coke-burn treatment wherein the coked catalyst is contacted with an oxide-containing gas at selected temperatures. Typically, the gas will contain oxygen within the range of about 1.0 volume percent to about 21 volume percent. The concentration of oxygen in the gas should be maintained at a level which will not result in the production of temperatures that will be in excess of 1,100° F., preferably, in excess of 1,050° F.

The rhenium-gallium catalytic composition of the present invention is capable of being regenerated and is capable of withstanding the conditions employed in the regeneration treatment. If the catalyst is employed in an embodiment of the process which also employs one or more other reforming catalysts, such other catalyst should be capable of being regenerated.

A preferred embodiment of the process of the present invention is depicted in the accompanying FIGURE. This FIGURE is a simplified schematic flow diagram of the preferred embodiment. It does not include certain auxiliary equipment, such as heat exchangers, valves, pumps, compressors, and associated equipment, which would be needed in various places along the flow path of the process in addition to the pump and compressor that are depicted in the drawing. Such additional auxiliary equipment and its location requirements would be quickly recognized by one having ordinary skill in the art. Therefore, such equipment is not shown in the FIGURE.

In the embodiment represented in the FIGURE, a naphtha heart cut, having a boiling range of about 160° F. to about 400° F., preferably, about 180° F. to about 380° F., is obtained from source 10. This feedstock is passed through line b 11 into pump 12, which pumps the hydrocarbons through line 13. Hydrogen-containing recycle gas is introduced into line 13 via line 14 to be mixed with the hydrocarbons in line 13. The resulting hydrogen-hydrocarbon mixture passes through line 13, furnace 15, and line 16 into the top of reactor 17. The material is introduced into reactor 17 at a temperature of about 940° F. The outlet temperature of reactor 17 is approximately 800° F. and the pressure in reactor 17 is within the range of about 150 psig to about 400 psig.

The effluent from reactor 17 passes through line 18, furnace 19, and line 20 into the top of reactor 21. Sufficient heat is introduced into this hydrogen-hydrocarbon stream by furnace 19 so that the temperature at the inlet of reactor 21 is approximately 960° F. The outlet temperature of reactor 21 is approximately 855° F. and the pressure in reactor 21 is within the range of about 140 psig to about 380 psig.

The effluent from reactor 21 passes through line 22, furnace 23, and line 24 into the top of reactor 25. This effluent is heated in furnace 23 so that the inlet temperature of reactor 25 is approximately 960° F. The outlet temperature of reactor 25 is approximately 940° F. and the pressure in reactor 25 is within the range of about 130 psig to about 360 psig.

The effluent from reactor 25 passes through line 26, furnace 27, and line 28 into the top of reactor 29. This hydrocarbon effluent is heated in furnace 27 so that the inlet temperature of reactor 29 is about 980° F. The outlet temperature of reactor 29 is about 960° F. and the pressure in reactor 29 is within the range of about 120 psig to about 350 psig.

Reactors 17, 21, and 25 all contain a catalyst comprising platinum and chloride on a support of catalytically active alumina. The catalyst may be promoted by a small amount of rhenium. In general, the catalyst contains 0.1 to about 2 weight percent platinum and 0.1 to 5 weight percent chloride, preferably, 0.4 to 1 weight percent chloride. The fourth reactor, or tail reactor, in the system contains an embodiment of the rhenium-gallium catalytic composition of the present invention. This embodiment of the catalytic composition comprises about 0.5 weight percent rhenium and about 0.5 weight percent gallium supported on catalytically active alumina.

Not shown in the FIGURE is a fifth reactor, which reactor contains a mixture of layers of the two catalysts. This additional reactor is employed as a swing reactor for each of the four reactors in this system when the catalyst in a particular reactor has become deactivated and must be regenerated. The reactor containing this deactivated catalyst is removed from the system and is replaced by the swing reactor in order that the reforming system may be operated continuously, even though the deactivated catalyst has been removed from the system and is being regenerated.

The hydrogen-hydrocarbon ratio and the WSHV employed in the various reactors fall within the respective ranges of values as expressed hereinabove.

The effluent from reactor 29 passes through line 30, water cooler 31, and line 32 into gas-liquid separator 33. Gas-liquid separator 33 is operated at a pressure of about 100 psig to about 320 psig and at temperatures of about 100° F. Liquid product is removed from separator 33 through line 34 to be sent to a suitable product recovery system from which a high-octane-number product is obtained. Gaseous material is removed from separator 33 through line 35. A portion of this gas is removed from the system through line 36 to be used as other refinery units. The remainder of the hydrogen-hydrocarbon gas in line 35 is compressed by compressor 37 to be sent through lines 38 and 14 as hydrogen-hydrocarbon recycle gas. When necessary, make-up hydrogen gas may be introduced into the system from source 39 via line 40.

The following examples are presented herein to facilitate the understanding of the present invention. These examples are presented for the purposes of illustration only and are not intended to limit the scope of the present invention.

An embodiment of the non-noble-metal catalyst of the present invention was to be compared with another reforming catalyst. A description of each of these catalysts is presented below.

Catalyst A

A catalyst comprising rhenium and gallium on a catalytically active alumina was prepared in the laboratory.

50g. of 20/40 mesh American Cyanamid gamma alumina were impregnated with 100 ml. of solution containing 0.25g. gallium, 0.25g. rhenium, and 1.1 cc of concentrated hydrochloric acid. The gallium solution was prepared by dissolving pure gallium metal in aqua regia followed by evaporation of the excess acids and addition of nitric acid to form gallium nitrate. The rhenium solution was prepared by dissolving rhenium metal in 30% hydrogen peroxide solution.

The impregnated sample was dried 3 hrs. at 250° F. in air, and calcined 3 hrs. at 1000° F. Nominal composition was 0.5% rhenium, 0.5% gallium, and 0.80% chloride.

Catalyst B

A commercial catalyst purchased from American Cyanamid, Cyanamid No. WI 1098, contained 0.54% platinum, 0.54% rhenium, and 0.79% chloride supported on a gamma alumina.

The catalyst was crushed to 20/40 mesh for tests.

The above catalysts were tested individually in a micro-flow test unit. In this unit, a mixture of preheated oil and hydrogen was passed over a small sample of the catalyst being studied. Hydrogen was obtained from a cylinder and the hydrocarbon stream was pumped into the unit by a positive-displacement pump. The reactor had an internal diameter of 0.622 inch and was 20 inches long. The catalyst bed was supported on a layer comprising 3 cc of glass beads. The off-gas was continuously vented and the liquid product was collected in either a product receiver or a slop receiver. The reactor was immersed in a heat bath of Du Pont HITEC. Temperatures in the reactor were determined by employing a manually-operated thermocouple. For the purpose of obtaining an octane number, a liquid sample was collected for a period of about 18 hours. For weight balance information, a 1 hour accumulated liquid sample was obtained. Analyses were obtained by means of gas-chromatographic techniques. Prior to being charged into the reactor, each catalyst was ground to a 20-40 mesh material (U.S. Sieve Series).

The feedstock employed in the tests described in this example is a mildly-reformed mid-continent naphtha possessing the properties listed in Table I.

TABLE I

| Feedstock Properties | |
|---|---|
| Gravity, ° API | 48.9 |
| Research Octane No., Clear | 87.4 |
| ASTM Distillation, ° F. | |
| IBP | 118 |
| 10% | 188 |
| 30 | 230 |
| 50 | 256 |
| 70 | 284 |
| 90 | 324 |
| EBP | 398 |
| Composition, Vol. % | |
| Paraffins | 44.9 |
| Naphthenes | 3.1 |
| Aromatics | 52 |

Each of the catalyst was tested in the micro-unit with the above feedstock. The average catalyst temperature employed was the kinetic average temperature of the catalyst bed. Each of the catalyst beds occupied from about 5½ to about 7 inches of reactor length. The results of the tests are presented in Table II.

TABLE II

| | Test Data | | | | | |
|---|---|---|---|---|---|---|
| | CATALYST A | | | CATALYST B | | |
| PERIOD NO. | 1 | 2 | 3 | 1 | 2 | 3 |
| PRESSURE, psig | 200 | 200 | 200 | 200 | 200 | 200 |
| AVG. TEMP., ° F. | 895 | 895 | 894 | 899 | 899 | 900 |
| CATALYST WT., gms | 13 | 13 | 13 | 13 | 13 | 13 |
| CATALYST VOL., cc | 21 | 21 | 21 | 22 | 22 | 22 |

TABLE II-continued

| | Test Data | | | | | |
| | CATALYST A | | | CATALYST B | | |
| PERIOD NO. | 1 | 2 | 3 | 1 | 2 | 3 |
|---|---|---|---|---|---|---|
| WHSV | 3.62 | 3.62 | 3.62 | 3.62 | 3.62 | 3.62 |
| HYDROGEN RATE, SCFB | 3,730 | 3,520 | 3,350 | 3,080 | 3,160 | 3,070 |
| $C_5^+$ RESEARCH OCTANE NO., CLEAR | 97.8 | 98.3 | 98.1 | 97.2 | 96.6 | 96.1 |
| HEAVY ULTRAFORMATE RESEARCH OCTANE NO. | 107.2 | 108.1 | 107.0 | 104.2 | 103.4 | 101.9 |
| $C_5^+$ YIELD, WT. % | 87.7 | 89.1 | 89.2 | 93.5 | 94.1 | 94.7 |
| ACTIVITY | 271 | 305 | 298 | 193 | 169 | 145 |

Each of these tests simulated a reforming system in which a naphtha had first been reformed over a typical platinum-chloride-alumina catalyst to an octane number of 87.4 and the resulting reformate was reformed over one of the catalysts. It can be seen that catalyst A provided higher octane number for the $C_5^+$ material. These data demonstrate the superiority of the preferred embodiment of the process of the present invention for the production of high-octane blending material.

We claim:

1. A process for the catalytic reforming of a hydrocarbon feed, said feed comprising a hydrocarbon stream boiling in the range of about 70° F. to about 500° F., which process comprises contacting a catalyst consisting of from about 0.1 to about 2 weight percent rhenium and from about 0.1 to about 2 weight percent gallium supported on a solid porous refractory inorganic oxide support, with said hydrocarbon feed and hydrogen, at a pressure of about 50 psig to about 1,000 psig, a weight hourly space velocity of about 0.5 to about 10 weight units of hydrocarbon per hour per weight unit of catalyst, a hydrogen addition rate of about 1,500 to about 15,000 standard cubic feet per barrel of feed and at an average catalyst temperature of about 850° F. to about 1,050° F.

2. The process of claim 1 wherein the pressure is about 50 psig to about 450 psig, the weight hourly space velocity is about 0.9 to about 4 weight units of hydrocarbon per hour per weight unit of catalyst, the hydrogen addition rate is about 4,000 to about 10,000 standard cubic feet per barrel of feed and the average catalyst temperature is about 875° F. to about 1,000° F.

3. The process of claim 1 wherein the preparation of said catalyst comprises impregnating the solid support with soluble compounds of rhenium and gallium followed by drying and calcining.

4. The process of claim 1 wherein the refractory inorganic oxide is a halogen-free inorganic oxide.

5. The process of claim 1 wherein the rhenium and gallium are characterized as metal, oxide, sulfide, or mixtures thereof.

6. The process of claim 1 wherein said catalyst consists essentially of from about 0.2 to about 0.8 weight percent rhenium and from about 0.2 to about 0.8 weight percent gallium.

7. The process of claim 1 wherein the refractory inorganic oxide of the second catalyst is a halogen-free inorganic oxide.

8. The process of claim 1 wherein the porous refractory inorganic oxide comprises catalytically active alumina, silica-alumina, silicamagnesia, titania-alumina or zinc-oxide-alumina.

9. The process of claim 8 wherein the porous refractory inorganic oxide comprises gamma alumina.

10. The process of claim 9 comprising about 0.5 weight percent rhenium and about 0.5 weight percent gallium supported on gamma alumina.

11. The process of claim 1 wherein the solid support comprises mordenite and a porous refractory inorganic oxide, said mordenite having a silica-to-alumina ratio within the range of about 6 to about 100.

12. The process of claim 11 wherein preparation of said catalyst support comprises blending finely-divided mordenite-type aluminosilicate material into a sol or gel of said refractory inorganic oxide to form a blend, gelling said blend by adding a solution of a suitable inorganic ammonium-affording compound, and drying and calcining the gel to form a calcined material.

13. The process of claim 12 wherein said refractory inorganic oxide is a catalytically active alumina and said mordenite is suspended in and distributed throughout a matrix of said alumina, said mordenite being present in an amount of about 1 weight percent to about 50 weight percent, based on the weight of said support.

14. A process for the catalytic reforming of a hydrocarbon feed, said feed comprising a hydrocarbon stream boiling in the range of about 70° F. to about 500° F., which process comprises contacting a first catalyst comprising platinum on a solid inorganic oxide support of gamma alumina with the hydrocarbon feed and hydrogen to achieve partial catalytic conversion, followed by contacting a second catalyst consisting of from about 0.1 to about 2 weight percent rhenium and from about 0.1 to about 2 weight percent gallium supported on a solid porous refractory inorganic oxide support, with the partially converted hydrocarbon feed and hydrogen, the contacting of both catalysts being conducted at a pressure of about 50 psig to about 1,000 psig, a weight hourly space velocity of about 0.5 to about 10 weight units of hydrocarbon per hour per weight unit of catalyst, a hydrogen addition rate of about 1,500 to about 15,000 standard cubic feet per barrel of feed and at an average catalyst temperature of about 850° F. to about 1,050° F.

15. The process of claim 14 wherein the rhenium and gallium of the second catalyst are characterized as metal, oxide, sulfide, or mixtures thereof.

16. The process of claim 14 wherein the pressure is about 50 psig to about 450 psig, the weight hourly space velocity is about 0.9 to about 4 weight units of hydrocarbon per hour per weight unit of catalyst, the hydrogen addition rate is about 4,000 to about 10,000 standard cubic feet per barrel of feed and the average catalyst temperature is about 875° F. to about 1,000° F.

17. The process of claim 14 wherein the first catalyst is promoted by an effective amount of rhenium.

18. The process of claim 14 wherein said second catalyst consists essentially of from about 0.2 to about 0.8 weight percent rhenium and from about 0.2 to about 0.8 weight percent gallium.

19. The process of claim 14 wherein preparation of said second catalyst comprises impregnating the solid support with soluble compounds of rhenium and gallium followed by drying and calcining.

20. The process of claim 14 wherein the porous refractory inorganic oxide comprises catalytically active alumina, silica-alumina, silicamagnesia, titania-alumina or zinc-oxide-alumina.

21. The process of claim 20 wherein the porous refractory inorganic oxide comprises gamma alumina.

22. The process of claim 21 wherein the second catalyst comprises about 0.5 weight percent rhenium and about 0.5 weight percent gallium supported on gamma alumina.

23. The process of claim 14 wherein the solid support of the second catalyst comprises mordenite and a porous refractory inorganic oxide, said mordenite having a silica-to-alumina ratio within the range of about 6 to about 100.

24. The process of claim 23 wherein preparation of said second catalyst support comprises blending finely-divided mordenite-type aluminosilicate material into a sol or gel of said refractory inorganic oxide to form a blend, gelling said blend by adding a solution of a suitable inorganic ammonium-affording compound, and drying and calcining the gel to form a calcined material.

25. The process of claim 24 wherein said refractory inorganic oxide is a catalytically active alumina and said mordenite is suspended in and distributed throughout a matrix of said alumina, said mordenite being present in an amount of about 1 weight percent to about 50 weight percent, based on the weight of said support.

* * * * *

UNITED STATES PATENT AND TRADEMARK OFFICE
CERTIFICATE OF CORRECTION

PATENT NO. : 4,134,823
DATED : January 16, 1979
INVENTOR(S) : Ralph J. Bertolacini et al.

It is certified that error appears in the above-identified patent and that said Letters Patent are hereby corrected as shown below:

Column 2, line 14, "ca also" should read -- can also --.

Column 2, line 26, "form blend, a gelling" should read -- form a blend, gelling --.

Column 3, line 53, "or a" should read -- of a --.

Column 6, line 28, "condition" should read -- conditions --.

Column 8, line 39, "line b 11" should read -- line 11 --.

Column 9, line 39, "as other" should read -- at other --.

Column 11, line 60 "claim 1" should read -- claim 6 --.

Column 11, line 65, "silica magnesia" should read -- silica- magnesia --

Column 13, line 7, "silica magnesia" should read -- silica-magnesia --.

Signed and Sealed this

Seventh Day of August 1979

[SEAL]

Attest:

LUTRELLE F. PARKER
Attesting Officer   Acting Commissioner of Patents and Trademarks